(12) United States Patent
Hamilton

(10) Patent No.: US 9,244,791 B2
(45) Date of Patent: Jan. 26, 2016

(54) FUSION OF MULTIPLE MODALITIES FOR DETERMINING A UNIQUE MICROELECTRONIC DEVICE SIGNATURE

(71) Applicant: The United States of America as represented by the Secretary of the Navy, Washington, DC (US)

(72) Inventor: Brett Hamilton, Heltonville, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 159 days.

(21) Appl. No.: 14/251,797

(22) Filed: Apr. 14, 2014

(65) Prior Publication Data

US 2015/0067422 A1 Mar. 5, 2015

Related U.S. Application Data

(60) Provisional application No. 61/870,293, filed on Aug. 27, 2013.

(51) Int. Cl.
*G01R 31/28* (2006.01)
*G06F 11/24* (2006.01)

(52) U.S. Cl.
CPC .................................... *G06F 11/24* (2013.01)

(58) Field of Classification Search
CPC ..................................................... G06F 11/24
See application file for complete search history.

*Primary Examiner* — Sam Rizk
(74) *Attorney, Agent, or Firm* — Christopher A. Monsey

(57) ABSTRACT

An example of the invention includes a process and apparatus combining test modalities that collates data, processes it into a standard format, evaluates trends and interrogates via an expert system can increase efficiency and yield greater confidence in testing of parts in a variety of supply chain segments. An exemplary process and test system can collect a variety of test data as pre-processed raw data from a plurality of modalities as an evaluation database. The evaluation database post-processes said raw data via data analysis output to an expert system and decision engine as exemplary rule sets. The decision engine generating a probability that a microelectronic device is unauthorized, does not meet specification(s), is defective or counterfeit.

9 Claims, 9 Drawing Sheets

Conceptual System Diagram

ATE Based

JTAG Controller Based

Examples of possible DUT evaluation modality configurations.

FUSION OF MULTIPLE MODALITIES FOR DETERMINING A UNIQUE MICROELECTRONIC DEVICE SIGNATURE

CROSS-REFERENCE TO RELATED APPLICATIONS

The present application claims priority to U.S. Provisional Patent Application Ser. No. 61/870,293, filed Aug. 27, 2013, entitled "FUSION OF MULTIPLE MODALITIES FOR DETERMINING A UNIQUE MICROELECTRONIC DEVICE SIGNATURE," the disclosure of which is expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 102,782) is assigned to the United States Government and is available for licensing for commercial purposes. Licensing and technical inquiries may be directed to the Technology Transfer Office, Naval Surface Warfare Center Crane, email: Cran_CTO@navy.mil.

BACKGROUND AND SUMMARY OF THE INVENTION

The present invention relates sensing and detection of electrical or other characteristics associated with defective or unauthorized items in a supply chain using multiple detection and data system modalities. Detection and/or part/system attribute or data modalities can include multiple varieties of particular testing methods or procedures, data systems containing authorized/defect/unauthorized attribute data for individual or classes of items, as well as a variety of different sensory systems that can used for testing items, and/or related data collections containing electrical or other characteristics associated with items of interest. Defects or unauthorized status can include parts that do not conform to their specifications, are not authorized by an original equipment manufacturer, a case where a used part is being passed off as a new part, or a case where a part or component has been subjected to one or more damage or stress events exceeding acceptable limit such as electrostatic discharge (ESD) events. System defect or supply chain problem detection is increasingly more difficult given large volumes, difficulty in accessing parts in an assembly, and different sizes, shapes, and input/output structure, particularly for mass produced parts or defect detection for parts that have left a factory. Thus, there is a need to improve electronic system supply chain defect detection capabilities which can be used at any stage in a supply chain.

A common problem with existing methods of acquisition and comparison of parts in a supply chain is that they are generally not good at accounting for normal manufacturing process variations, which can vary with device lots and foundries. Testing systems also tend to focus on a single stress indicator, such as input/output (I/O) shift due to ESD. Thus such testing systems or approaches do not represent comprehensive evaluation methods nor do they address cases where a part or system is non-conforming to its specification or advertised status e.g., new/not-used/damaged to a small extent. Existing systems also do not provide a combination screening capability which includes ability to screen parts for both aging and environmental stress in addition to other factors such as physical characteristics. Existing systems also do not combine many different data sets to create a comprehensive set of data using simpler and less costly methods and thus provide a reliable and significantly accurate system which permits high capacity or high speed testing system. An embodiment of the invention can provide testing in different locations of a supply chain for parts in different part, end use, or packaging configurations.

One embodiment of the invention uses multiple test detection and data collection/input modes or modalities coupled with one or more decision engines such as neural networks, image recognition, statistical correlation tools, and decision trees, which can incorporate various learning processes. Another embodiment can also include a data collection system with one embodiment including electromagnetic (EM) sensors and data collection inputs adapted to sense test data and input the data to an embodiment of the multiple mode analysis using, e.g, a decision engine to evaluate a device under test (DUT) system. For example, an embodiment of the invention can incorporate integration of multiple EM sensors as well as data inputs and in synchronization with DUT stimulation for the purpose of producing device unique EM signatures accompanied by a decision engine, including a neural engine, to provide a variety of novel embodiments of the invention to meeting a variety of supply chain item defect or unauthorized item detection needs.

An exemplary embodiment can apply a decision engine to multiple electrical characteristic modalities data sets for the purpose of determining a probability that a microelectronic device is unauthorized, does not meet specification(s), or is defective. Inputs to an exemplary decision engine can include a variety of potential data sets that can be evaluated. The additional information obtained in applying multiple data sets in combination with a sensor system that can be used with a wide variety of DUTs, both in a factory and elsewhere, will allow a much more accurate probability assessment of DUTs. Testing systems can also use various methods for measuring different stressors that would indicate a part has, for example, been previously used or stressed (thus is unacceptable or does not meet specification(s)), such as experiencing an ESD damage event.

An exemplary stimulus including multiple electrical characteristic testing regimes could be applied in such a way as to produce one or multiple device dependent signatures, including signatures associated with known good devices and known bad devices, which correlate signature information with DUT testing results using same or similar tests employed in creating the device dependent signatures which are useful in determining a probability that a device has a defect, improper part installed, or has otherwise experienced environmental stress. An exemplary implementing system can include an artificial intelligence (AI) or expert system rule base which runs if/then statements against DUT test results to perform correlation tasks.

An exemplary system can include a neural network or other AI system which permits an initial identification or flagging of a suspect part or system based on a first application of the invention. A result of a manual inspection of the identified or flagged part can then be input into the invention to update a reliability data field associated with one signature or a pattern of signatures using, for example, a neural network type learning system.

An embodiment of a learning system can update a device signature database which is used to determine a probability of accuracy relative to flagged or identified suspect part. Device signatures can include data sets such as, for example, failure/ defect/counterfeit indicators and non-failure/defect/counterfeit indicators along with relative weights (denoting relative strength of the indicator) assigned to each indicator which are used when factors are combined to create a composite acceptance/reject determination and probability indicator.

Known bad and known good data signatures for specific devices or parts as well as classes of devices or parts can be created. Counterfeit detection indicators can include factors associated with ESD, mischaracterization, ageing, factory setting data defaults in memory components, predicted built in test (BIT) results, material composition, structural features, infrared signatures associated with different operating modes, vibration/mechanical stress, quality factors, over-clocking testing (with and without artificially induced ageing and overclocking testing (both to spec and to max performance failure) at different age equivalent points), and impedance testing. Tests which identify bad or unacceptable parts or systems based on a specific or group of indicators can generate new data signatures data sets which are then associated with a known bad data set with an increased relative weight or a known-bad indicator which are used in correlation with test results from a DUT using same or similar tests used to formulate data signatures and then factored into a composite acceptance/rejection determination and probability indicator formulation.

An exemplary EM apparatus may include a positioning system, switch matrix, power combiner, switch and EMI shielding to minimize stray EMI signals. An exemplary embodiment can also combine various probe types, such as E-field, and H-field probes of varying bandwidths, as well as visual, infra-red, etc in an integrated manner.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

One aspect of the invention includes fusion of multiple electrical characteristic modalities generating output data from a microelectronic device (DUT) residing in, e.g., an electrical loadboard or fixture during interrogation or testing to support screening. A DUT can then be screened, e.g., by electrical and/or optical tests, to determine if it is an unauthorized, counterfeit, damaged, non-conforming to specification(s), or a defective item. Application of multiple data sets can enable a high accuracy probability determination of a particular condition or status associated with said DUT e.g., a unique device signature.

Various methods may be integrated to measure different aspects of a DUT. For example, certain indicators associated with damage events, e.g., age or stress, that indicate a DUT or part has, for example, been previously used or stressed, such as experiencing an ESD event.

Figure 1:
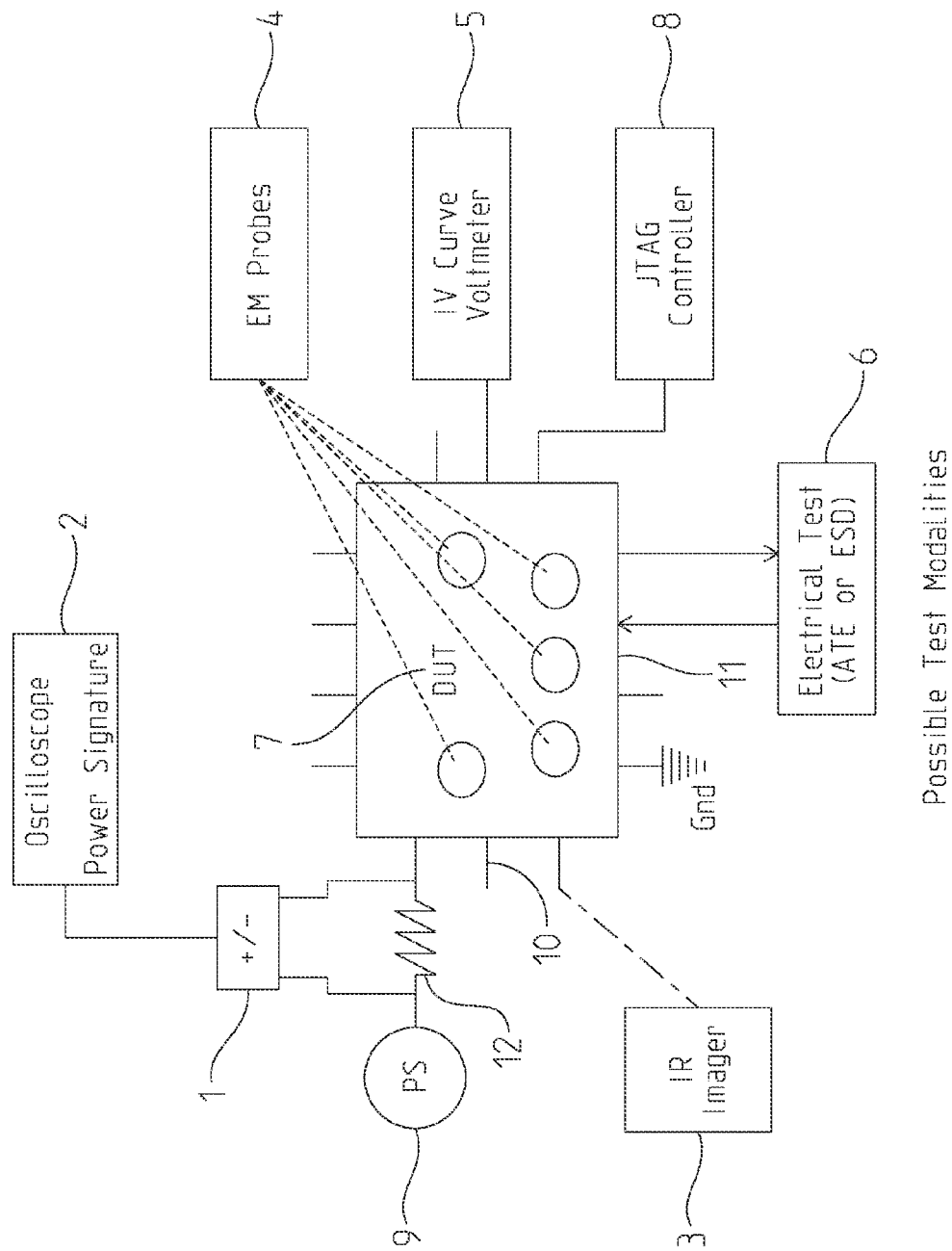
FIG. 1 shows a conceptual block diagram of potential electrical and optical characteristics incorporated to apply a fusion of multiple electrical modalities for a purpose of determining a unique device signature of a microelectronic device to support screening of counterfeit or parts that do not meet desired specifications.

Referring to FIG. 1, a conceptual block diagram is shows an exemplary combination of testing modalities by an embodiment of the invention comprising a DUT 7 connected to an electrical loadboard 11 having a plurality of I/O pins 10, and a plurality of EM probes 4, and interconnected or tested with a plurality of output test modality data. A differential amplifier 1 can be used to measure a current across a series resistor 12 with the DUT 7 and power supply 9. An exemplary method or testing modality can produce a power signature data (PSD) including data captured on an oscilloscope 2 which shows DUT 7 operational current vs time.

PSD can be collected or generated under various conditions or via various approaches including in synchronization with DUT 7 stimulation from automatic test equipment (ATE) 6. ATE 6 provides DUT stimulation and a measures response. For example internal timing properties, voltage thresholds, and correct functional operation characteristics can be measured. Output PSD can include, e.g., a current signature.

Exemplary embodiments can also include a test modality system adapted to sample and produce output from E-field or H-field probes 4 that measure EM emissions from a DUT 7. Electromagnetic Signature Data (EMSD) can be sensed and recorded under various conditions including in synchronization with DUT stimulation from an exemplary ATE 6. Exemplary EMSD output can include a field emission map in a frequency or time domain.

Another test modality can include a plurality of EM probes 4 formed into an array configuration to detect particular EM emissions such as a particular EM emission pattern from a particular set of components on a DUT 7 forming an EM signature pattern.

An embodiment of the invention can include another testing modality such as multiple types of EM sensors. For example, a plurality of EM probes 4 can include combinations of E-field and H-field sensors of various bandwidths. An embodiment of the invention using an array allows for optimizing signal quality for a given technology and acquisition environment.

Another testing modality can include use of Thermal Signature Data (TSD) can be produced by an infrared (IR) imager 3 that captures an IR image of a DUT 7. TSD can be taken under various conditions including in synchronization with DUT 7 stimulation from the automatic ATE 6. TSD output data can include a thermal map of a DUT 7 surface for a known good device/item or portion of such a device/item as well as known bad/unauthorized/defective device or portion of a device/item.

Another set of modalities can include creation and use of Current vs Voltage (IV) curve data that can be measured by an embodiment including an IV curve voltmeter 5. IV curve testing can include a system which forces or injects a voltage and measures a resulting current. IV curve data can be obtained with an embodiment that may incorporate ATE or another embodiment can include a dedicated automated tester for testing which can include ESD detection.

Another testing modality can include creation and use of Pulse Response Data (PRD) which can be obtained by an embodiment which can include an ESD tester 6 which can apply a pulse for measurement on one or more EM sensors or with an oscilloscope 2 providing per pin pulse response. PRD can include an exemplary output including a frequency or time domain waveform or frequency map.

Another testing modality can include an embodiment that may also include a Joint Test Action Group (JTAG) controller 8 electrical test. JTAG is a common name for the IEEE 1149.1 Standard Test Access Port and Boundary-Scan Architecture. A JTAG controller 8 can be used for testing printed circuit boards and internal DUT 7 testing such as logic built in self-test (LBIST). A JTAG controller 8 can be used to set or read data or signal levels on I/O pins 10 via boundary scan, initiate BIST or program internal memory. JTAG electrical test data output can include an embodiment with a test signature associated with, for example, a specific part or class of parts.

Figure 2:
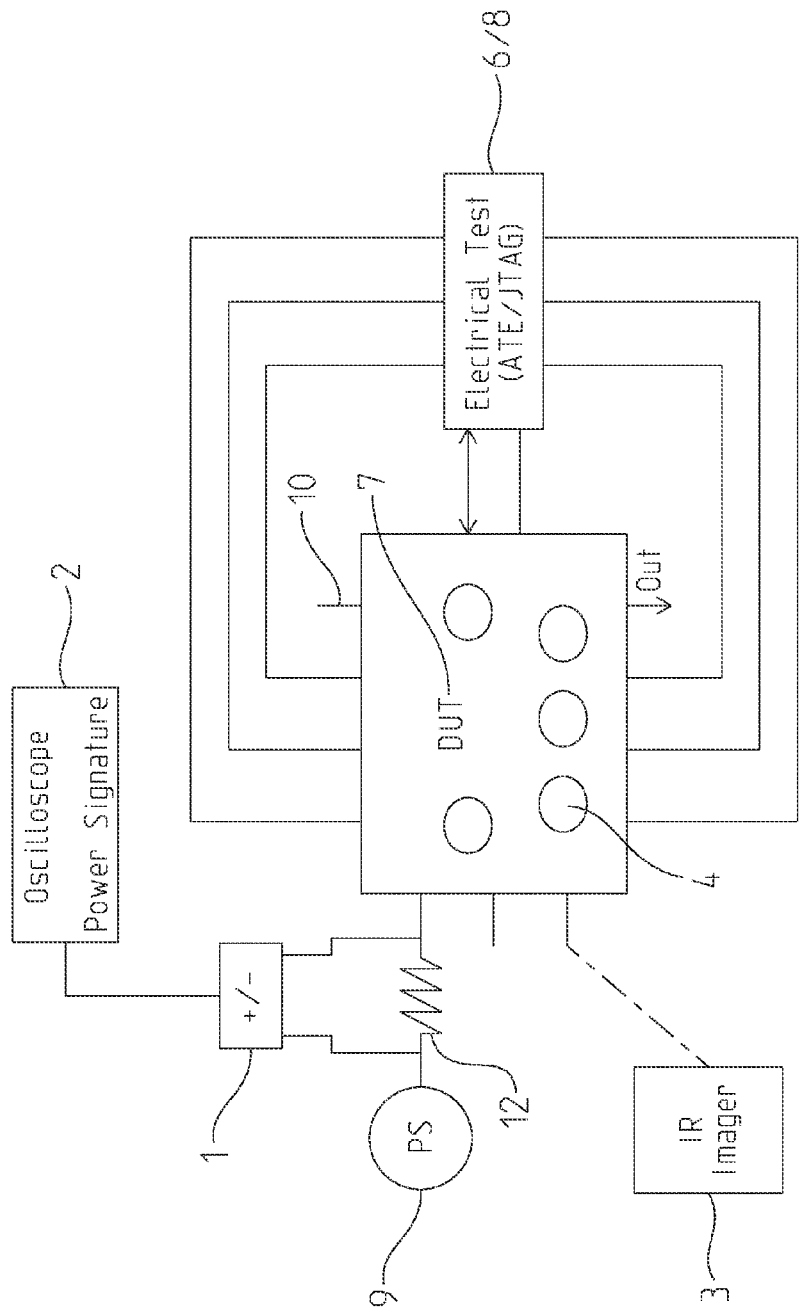
FIG. 2 shows an exemplary schematic diagram of one aspect of an automatic test equipment (ATE) based embodiment of the invention.

FIG. 2 shows an exemplary schematic diagram of another modality that includes an ATE based tester as one example embodiment of the invention. An ATE based testing assembly is shown which comprises a loadboard 11 having articulated I/O pins 10 and EM probes 4 positioned over a DUT 7, power supply 9, oscilloscope 2, differential amplifiers 1 and series resistor 12, JTAG controller 8, IR imager 3, and ATE 6. The articulated EM sensors can be actuated by a control system which has a system which can position the EM sensors to desired probe contact locations based on, for example, a pre-stored data set which is used to place the EM probes 4 in contact with test points on the DUT 7. Hence, the control system can position the EM probes 4 to operate with different DUTs.

An ATE based testing modality can include a full specification based electrical test. An exemplary ATE can emulate a JTAG testing system allowing, among other things, a JTAG only mode for testing DUTs including a known good or known bad item which can then generate test data or signatures used in later supply chain detection system operation. ATE based testing also can be configured to perform IV curve testing since exemplary amplifiers 1 can be coupled with an oscilloscope 2 which provides a PSD test. An electromagnetic and IR signature may also be obtained via an IR imager 3. All or a subset of the above can be implemented based on technology, budget, time, etc. For example, an ATE could initiate LBIST via a JTAG command sequence with the acquisition of a power signature and probes 4 capturing an EM signature. EM probes 4 can be adapted to be repositionable or movable to be placed over specific areas of interest of a particular DUT 7.

Figure 3:
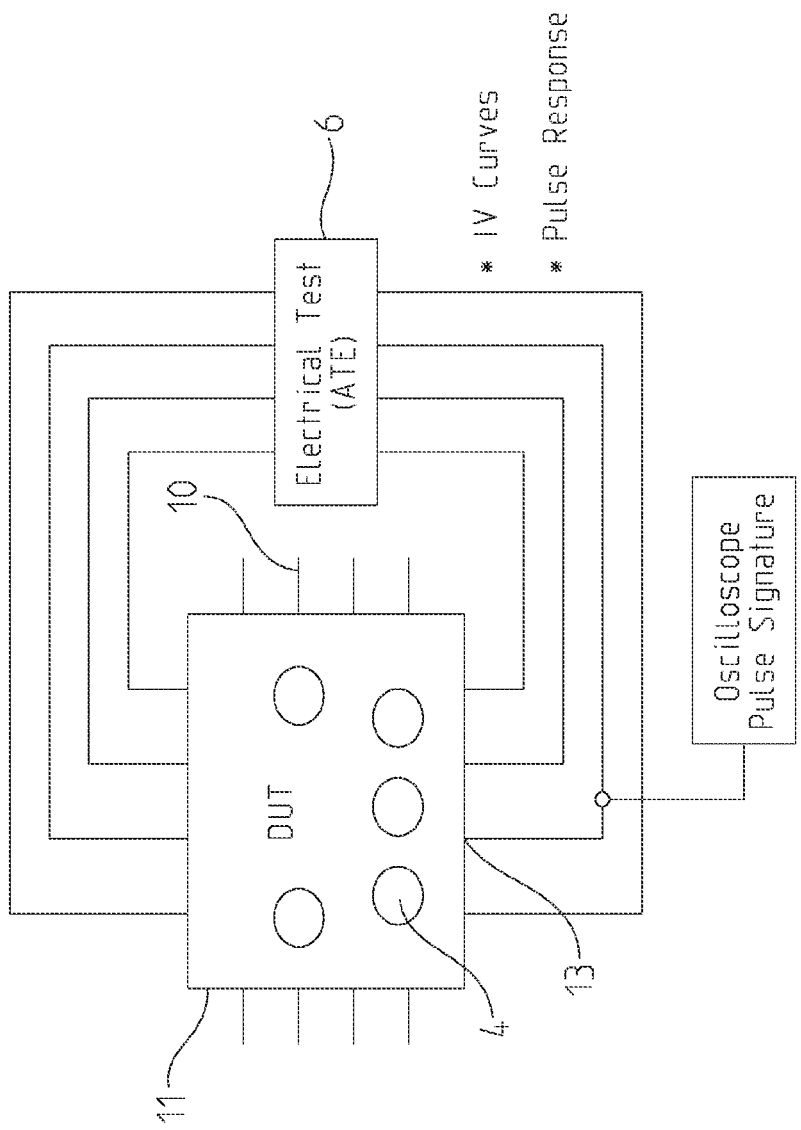
FIG. 3 shows an exemplary schematic diagram of one aspect an ESD test embodiment of the invention.

FIG. 3 shows an exemplary schematic diagram of an ESD based tester as one embodiment of the invention. An ESD based testing assembly including a loadboard 11 having articulated I/O pins 10 and EM probes 4 positioned over a DUT 7, and ATE 6. A system, such as described herein, can be adapted to induce low voltage signal level stimulus or high voltage ESD stress on a DUT 7 and record measure effects. Different types of stimulus can be induced, e.g., an ESD tester can apply a low voltage electrical transit pulse, creating a pulse on pin 13, for acquiring a pin pulse response signature. Or an escalating series of voltage or electrical discharges can be applied or exposed to a known-good DUT 7 such as, e.g., a baseline or non-stress input then 250 volts, 500 volts, 750 volts, etc. which are measured as pin pulse response data or IV curves for DUT characterization.

Figure 4:
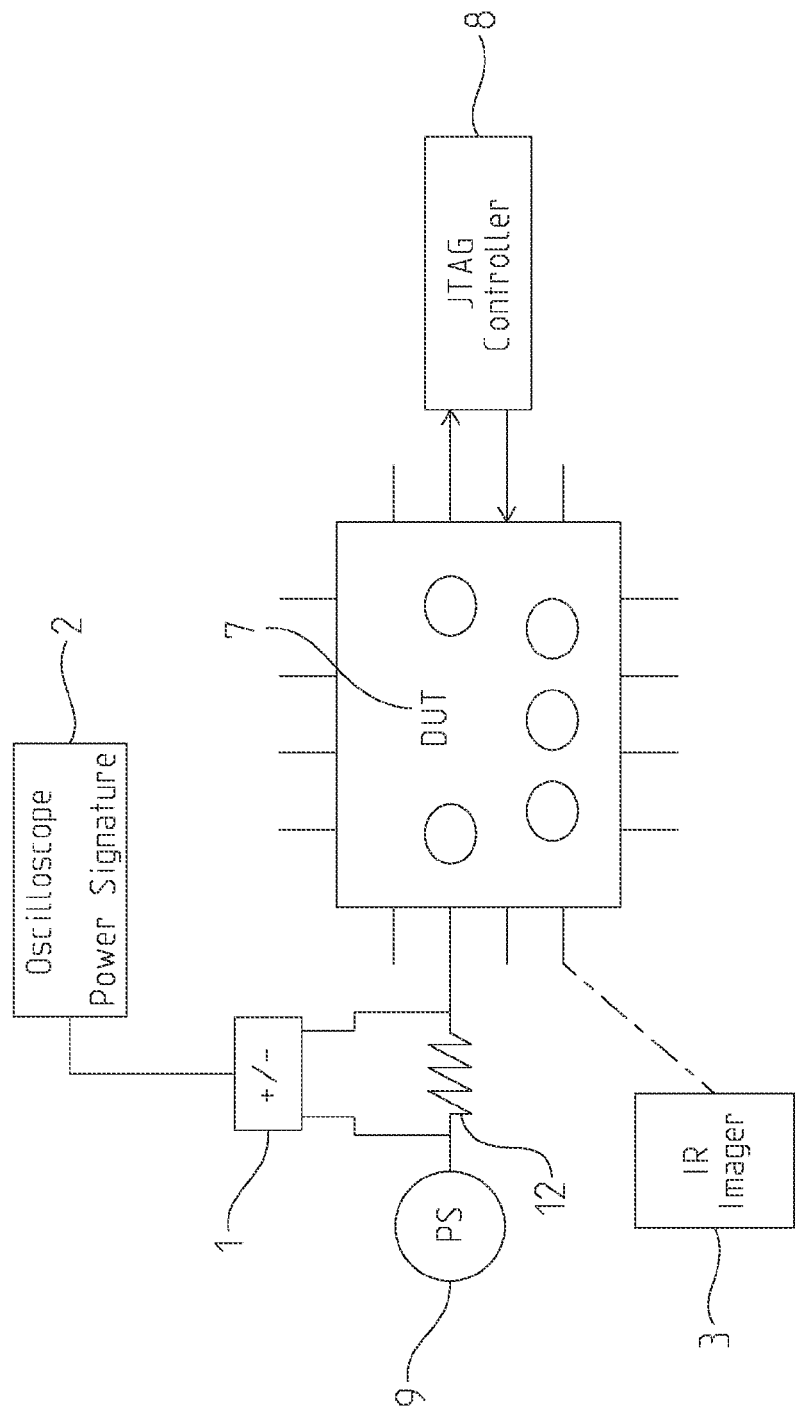
FIG. 4 shows an exemplary schematic diagram of one aspect of a joint test action group (JTAG) based embodiment of the invention.

FIG. 4 shows an exemplary schematic diagram of a JTAG based tester as another embodiment of the invention. A JTAG based testing assembly including a loadboard 11 having articulated I/O pins 10 and EM probes 4 positioned over a DUT 7, and JTAG controller 8. A JTAG based test being used for detecting ageing of a DUT 7 relative to a known part aged via accelerated life burn-in processes, e.g., controlled heating to induce age related stresses. At predetermined times based on the technology and the burn-in environment, the part or DUT can be retested to provide data for an equivalent age which is then used in later testing of a test article DUT for detection of specific conditions such as defects, unauthorized, incorrect characterization of a part's statute (e.g., new when the item is used or damaged), or counterfeit items. For example, an escalating series of aging effect producing processes (e.g., new known-good (baseline), five years, 10 years, 15 years, etc.) can be applied or exposed to a known-good DUT which are measured by a JTAG testing system. Accelerated life test of sacrificed parts with unknown pedigrees could provide data pertaining to the remaining life for that particular device, e.g., using an oscilloscope 2 or IR imager 3, where such tests are useful to determine remaining life for reliability purposes.

Figure 5A:
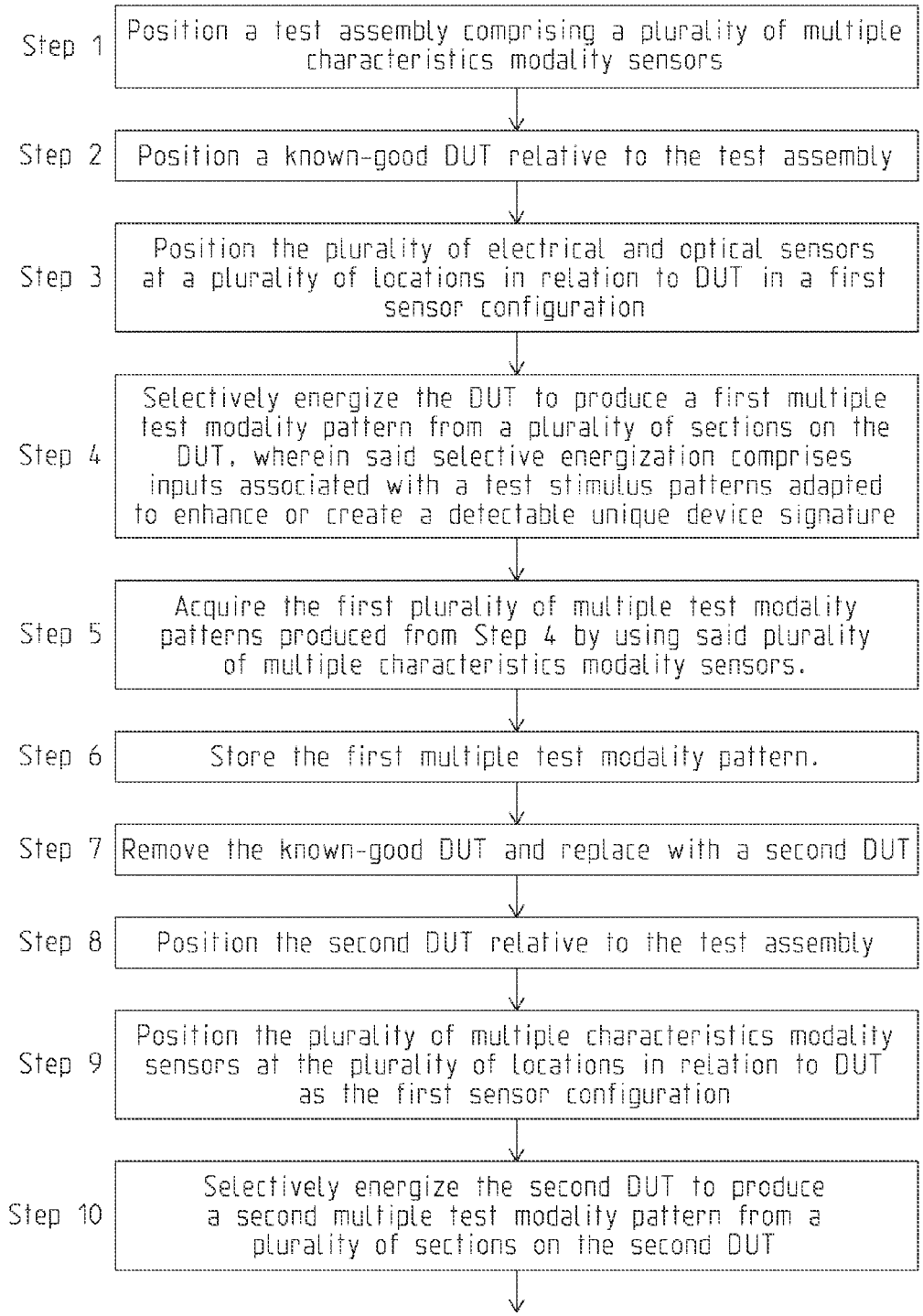
FIGS. 5A and 5B show an exemplary processing sequence in accordance with one embodiment of the invention.
Figure 5B:
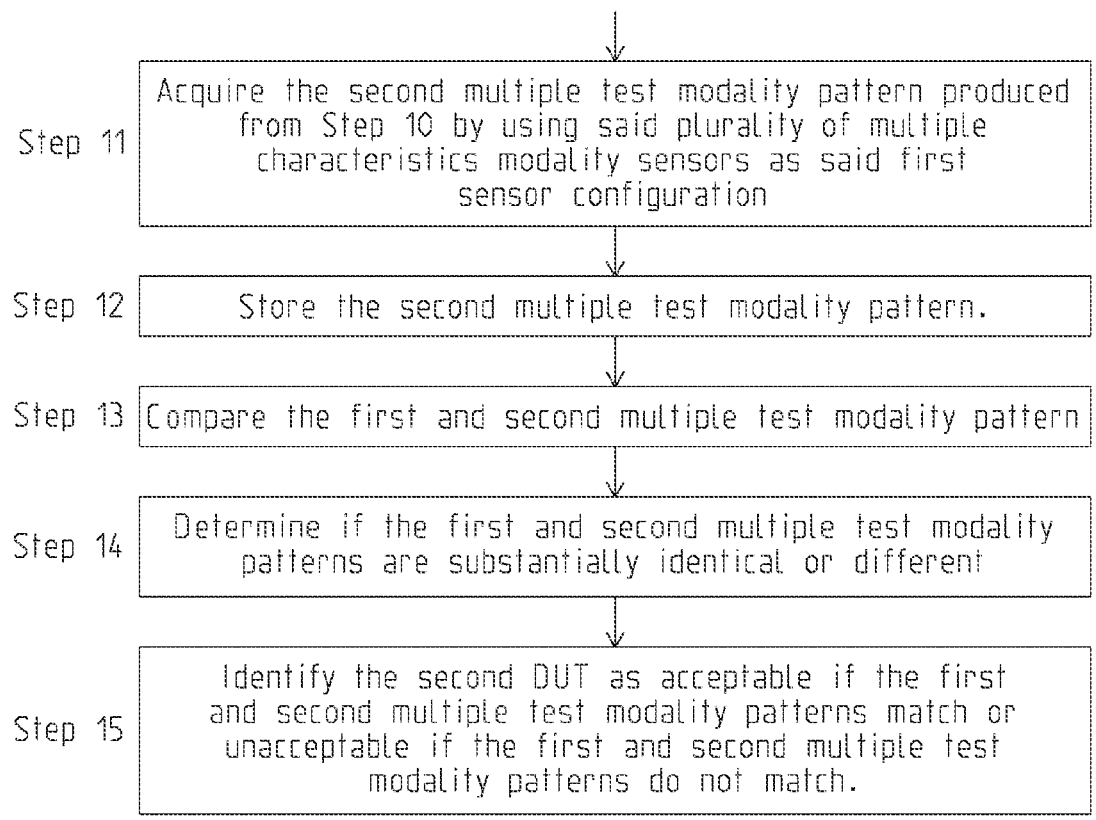

FIGS. 5A and 5B show an exemplary processing sequence in accordance with one embodiment of the invention. At Step 1: position a test assembly comprising a plurality of multiple characteristics modality sensors such as discussed above; At Step 2: position a known-good DUT relative to the test assembly; At Step 3: position a plurality of test modality sensors such as electrical and optical sensors at a plurality of locations in relation to DUT in a first sensor configuration; At Step 4: selectively energize the known-good DUT based on one or a plurality of first multiple test modality stimulus pattern inputs such as discussed above, e.g. an ATE or JTAG electrical test providing IV curves, power signature, thermal signature, EM signature, inductance, capacitance, impedance, pin pulse response, time and frequency domain acquisition, into a plurality of sections on the known-good DUT, wherein the selective energization can comprise inputs associated with the first multiple test modality stimulus patterns input that is adapted to enhance or create a detectable unique multiple test modality device signature; At Step 5: acquire a plurality of first multiple test modality stimulus test result data from the one or a plurality of first multiple test modality stimulus patterns produced from Step 4 by using said plurality of multiple characteristics modality sensors; at Step 6: store the plurality of first multiple test modality stimulus data; At Step 7: remove the known-good DUT and replace with a second DUT; At Step 8: position the second DUT relative to the test assembly; At Step 9: position the plurality of multiple characteristics modality sensors at the plurality of locations in relation to the second DUT as the first sensor configuration; At Step 10: selectively energize the second DUT to produce a second one or a plurality of first multiple test modality stimulus pattern inputs into a plurality of sections on the second DUT; At Step 11: acquire a plurality of second plurality of multiple test modality stimulus test result data from one or a plurality of the first multiple test modality stimulus pattern produced from Step 10 by using said plurality of multiple characteristics modality sensors in said first sensor configuration; At Step 12: store the plurality of second multiple test modality pattern data; At Step 13: compare the first and second multiple test modality pattern data; At Step 14: Determine if the first and second multiple test modality patterns are substantially identical or different based on, for example, matching, fuzzy logic, ranges associated with categories of modalities e.g., plus or minus ten percent, etc; At Step 15: Identify the second DUT as acceptable if the first and second multiple test modality pattern data match or unacceptable if the first and second multiple test modality patterns do not match or are outside of predetermined ranges or specified correlation patterns/conditions.

Figure 6:
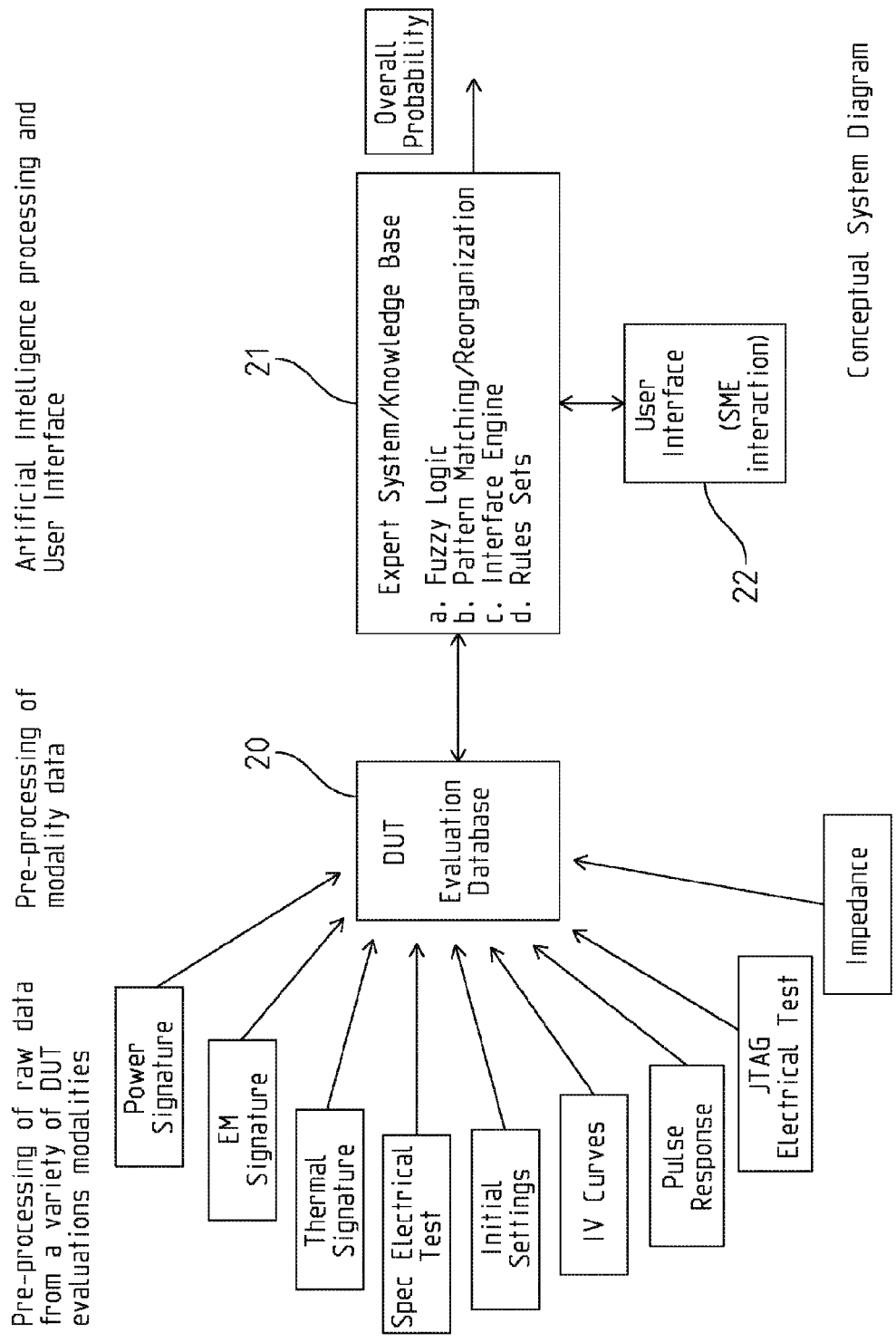
FIG. 6 shows a conceptual system diagram which distributes user software between pre-processed data, post-processed data and an expert system.

FIG. 6 shows a conceptual system diagram which distributes user software between pre-processed data, post-processed data, and an expert system. The system diagram including a plurality of raw data as inputs for an evaluation database 20 interconnected with an expert system 21 and user interface 22 to generate an overall probability. Software dedicated to pre-processing of raw data comprises a variety of DUT evaluation modalities, e.g. IV curves, power signature, thermal signature, EM signature, inductance, capacitance, impedance, and/or pulse response from ATE, JTAG or initial setting tests. Raw modality data can be pre-processed into a standard format and collected into a DUT evaluation database 20. Pre-processed modality data can next be processed and compared with data in the DUT evaluation database using analysis techniques specific to a particular modality data. For example, comparison of evaluation data with a DUT by, e.g., focusing on isolating trends in the comparison data created from, e.g., multiple testing of known good/known bad items, outliers in data sets associated with, e.g., known-good/known-bad, clustering of e.g., known good/known-bad/observed items later determined to be known-bad, and pattern recognition/identification. The evaluation database 20 can characterize known good value(s) or known bad value(s) for a DUT as well as default unknown value(s) and non-correlation factor(s) for expert system/decision engine 21 inputs comprising raw data, composite confidence level data and/or flag/ID data.

An assembly of data enables an expert system 21 to produce an innovative ability to fuse data from multiple modalities that are not typically combined. For example Thermal and Power Signatures data can be correlated in time with JTAG DUT stimulus/evaluation data. Many such combinations are possible, which offers much more sensitive DUT characteristic isolation and identification for used by the expert system 21 which differentiates between slight defects/stresses/age/quality/etc through indirect indicators and inconsistencies, fuzzy logic, pattern matching, pattern reorganization, user interface, and/or rule sets to generate an overall probability that a microelectronic device is unauthorized, does not meet specification(s), is defective or counterfeit.

One embodiment of an expert system 21 can include a reorganization pattern data structure. For example, a structure which compares said pattern data structures to actual device control data in order to generate flags and/or unique device ID of said DUT through pattern matching or reorganization. An expert system 21 may also comprise an exemplary neural network based decision system which allows data updates to govern its decision engine, where said decision engine being part of an expert system 21 incorporates a rule based system which permits a plurality of logical stepwise true/false conclusions from a plurality of "if/then" statements to address situations where an exact match is absent from said DUT where said "if/then" statements match input data against said control data stored within said decision engine or said expert system in order to determine a series of said true/false conclusions whereby said "if" statement of said rule based system accesses source code written to perform retrieval of a specific data value or multiple data values in said pattern data structure of said DUT, e.g., known good and/or known bad values associated with a specific device or a class of specific devices that qualify as either a genuine device or a counterfeit.

One embodiment of an expert system 21 can include a pattern matching structure. For example, a structure where a weighted data value and/or threshold range value, i.e. voltage for X attribute falling with a set A to B voltage range where said DUT may be an exact match to a said data weight value consistent with a counterfeit device or have a value within a said data range value of said counterfeit device.

One embodiment of an expert system 21 can also include a fuzzy logic pattern data structure. For example, a structure that can store a series of multiple modality test data patterns, e.g., a list and data values for known-good and known-bad along with weights and probability of accuracy or reliability of said flags or said ID of a suspect part.

One embodiment of an expert system 21 can include a user interface 22 pattern data structure. For example, an exemplary probability can be updated after a manual check user interface determines a pass/fail for the part. Over time, the probability can be increased or decreased based on storing results of said pass/fail manual check which is then used to alter said probability e.g., averaged with weighting to give more weight to recent tests over past tests.

One embodiment of an expert system 21 can include a rule set pattern data structure. For example, if said data value of a DUT is an exact match of a control data value, said "then" statement as next part of the rule is initiated to perform a specific data operation, e.g., saves a result to a test results file associated with said DUT. Said test results file will store specific information e.g., list of matched rules and other info relative to probability of match/flag and continuously learn as an artificial intelligence.

Figure 7:
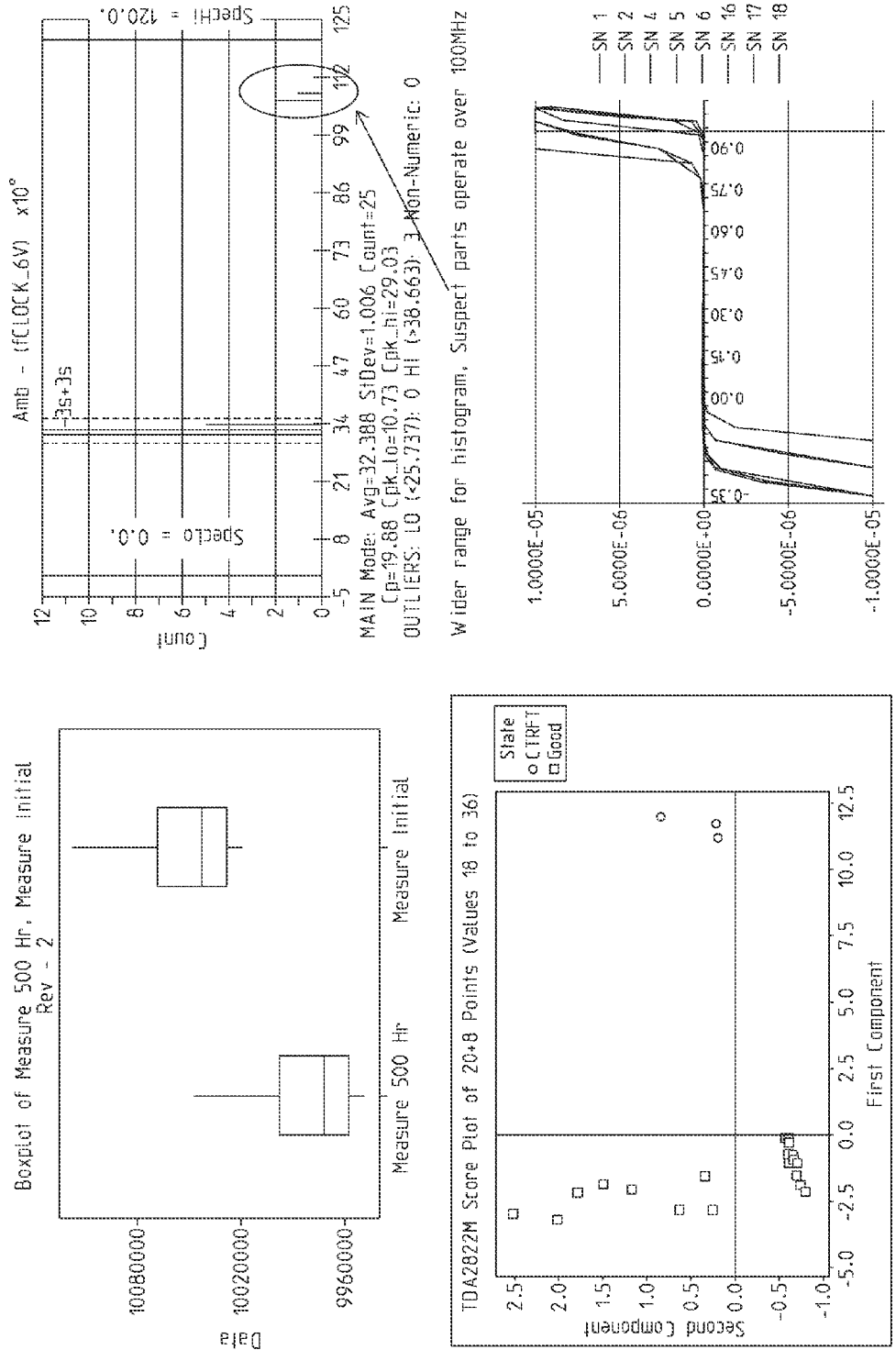
FIG. 7 shows exemplary analysis plots by an evaluation database used to process raw modality data for expert system input.

FIG. 7 shows exemplary analysis plots of actual data for the evaluation database 20 used to process raw modality data into more usable inputs for expert system 21 input including, e.g. box plots, score plots, histograms, IV curves, principle component analysis (PCA), discriminate analysis (DA), neural network analysis (NNA), traditional statistical analysis, pattern recognition, frequency analysis of impedance, capacitance and inductive components, etc.

One embodiment of the invention comprises a boxplot showing a shift in values of frequency from initial values to values taken after a specified number of hours for a DUT. A boxplot can provide a graphical summary of a distribution of a sample that shows its shape, central tendency, and variability. Boxplots can show shifts in values of frequency from initial values to values taken after a specific number of hours, e.g., 500 hours in this example, for a DUT e.g., an oscillator.

Figure 8:
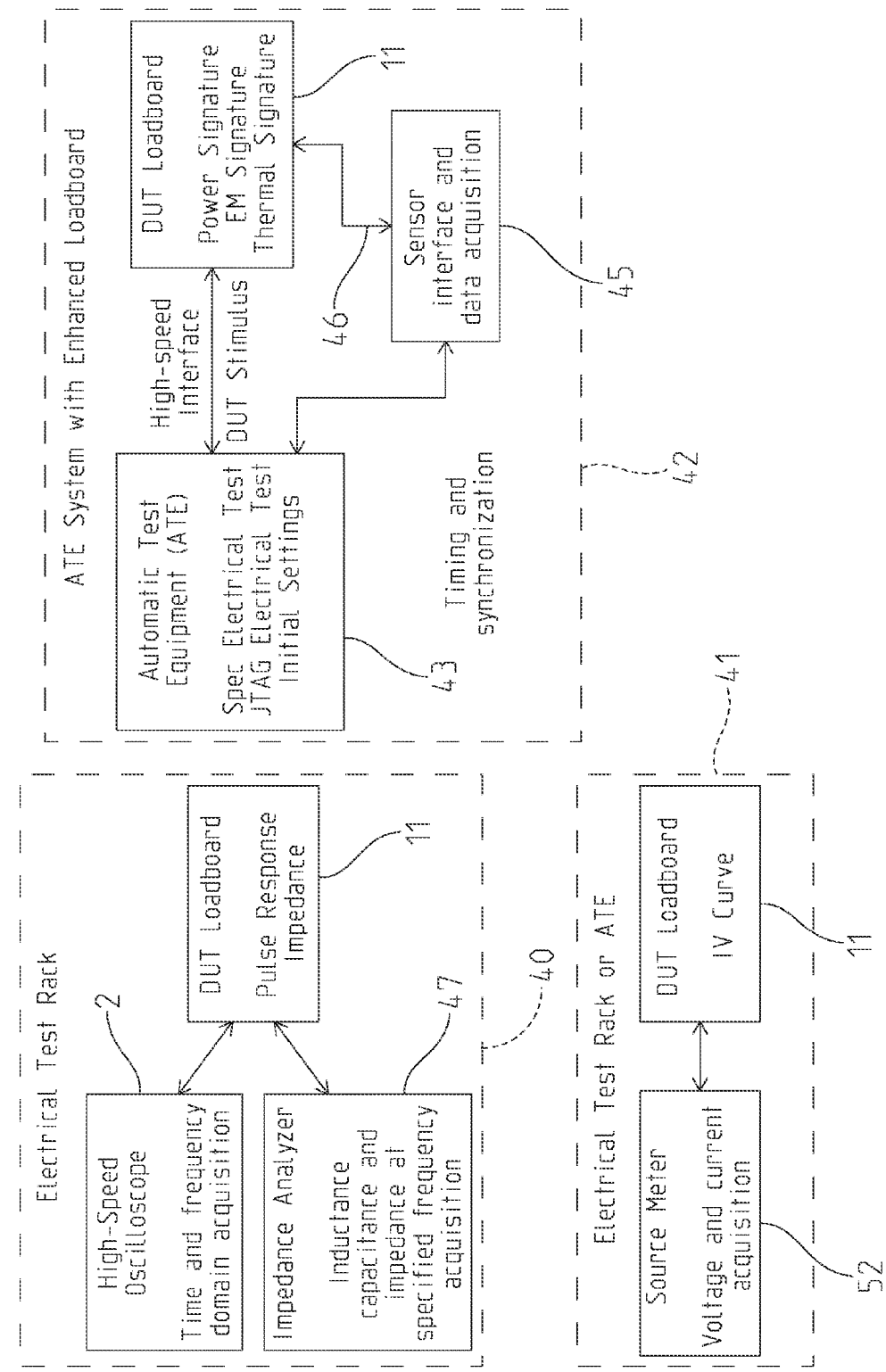
FIG. 8 shows examples of possible DUT evaluation modality configurations.

FIG. 8 shows examples of possible DUT evaluation modality configurations including e.g., an electrical test rack (ETR) 40 or ETR/ATE 41, ATE system with enhanced loadboard (ATESEL) 42. Each test system further comprising individual tests grouped specifically for greater raw data acquisition efficiency, DUT evaluation and expert system interrogation of a particular microelectronic device(s) or part(s). Such evaluation configurations provide raw data formatting so that data can be reduced to points of interest for the artificial intelligence expert system/decision engine, e.g., an ATE including external IR and/or EM sensors absent the need for manual operation of additional tests. A user interface can be applied for a selection of test modalities appropriate for a particular microelectronic evaluation.

One embodiment of an ATESEL 42 evaluation configuration comprises an ATE 43, e.g., JTAG, initial setting or spec electrical test interconnected via a high-speed interface 46 to the DUT loadboard 11 through which a DUT stimulus can be implemented for detecting a EM pulse response signature, thermal signature and/or power signature data response, the DUT loadboard 11 being simultaneously interconnected to a sensor interface 45 and data acquisition via a high speed interface 46 and synchronized with the ATE, and where the power signature, thermal signature and EM pulse response signatures are isolated responses detected from external modalities, e.g., IR imager 3. An ATESEL 42 evaluation configuration is suitable for large-scale production tests, wherein not all modalities except for those most effective would be used. For example, electrical spec tests of a particular microelectronic device data sheet including factory electrical performance specifications can remedy challenges associated with known counterfeits that can pass the electrical data sheet range markers since the known counterfeit may further discriminated by synchronization with additional tests, e.g., initial settings tests where a part may hold residual data that evidences that the part was once used.

One embodiment of an ETR/ATE 41 evaluation configuration can comprise a source meter 52 for voltage and current acquisition interconnected in tandem with a DUT loadboard 11 for acquisition of IV curve data. Exemplary IV curves can be implemented to test for ESD by generating an output voltage/current stimulus/response events. For example, such events could be, e.g., events associated with human discharge model specifications for circuit protection where IC chips may make contact with I/O pins and consequently damage the I/O pin by an ESD spark, and wherein use of the ATE tester simulates the normal I/O signals with complete control of timing and voltage controls to push the device's specification limits for further discrimination, characterization, or determination/testing.

One embodiment of and ETR 40 evaluation configuration may comprises a high-speed oscilloscope 2 and impedance analyzer 47 interconnected with a DUT loadboard 11. In this embodiment, time and frequency domains and inductance/capacitance/impedance at a specified frequency are detected respectively by the high-speed oscilloscope 2 and impedance analyzer 47 respectively for a plurality of electrical test signature data, e.g. pulse response.

One advantage of one embodiment of the invention includes providing an ability for users to implement an optimal design for a selected or target technology. Another advantage can include enabling rapid evaluation by creating a testing assembly, e.g., printed circuit board, with only sensor array elements, position of such elements and signal inputs for a control mechanism needing to be modified.

Although the invention has been described in detail with reference to certain preferred embodiments, variations and modifications exist within the spirit and scope of the invention as described and defined in the following claims.

The invention claimed is:

1. A test system apparatus for measuring a plurality of multiple test modalities and determining a defective or counterfeit microelectronic device, comprising:
   an electronic test board or fixture having a plurality of I/O pins adapted to couple with a device under test (DUT), said electronic test board or fixture further comprises a sensor array including a plurality of electromagnetic EM sensors adapted to be movable to cover specific areas of interest of said DUT;
   a first testing modality apparatus comprising a plurality of differential amplifiers comprising a time domain and signal domain signal analysis section, wherein the said differential amplifier coupled to an oscilloscope used to measure power signature data (PSD) as current versus time across a resistor in series with said DUT and a power supply during interrogation;
   a second testing modality apparatus comprising a plurality of electrical automatic test equipment (ATE) providing stimulation to said DUT through said test board or fixture, said ATE is operable to acquire internal timing properties, voltage thresholds, and correct functional operation characteristics from said DUT;
   a third testing modality comprising a plurality of E-field or H-field probes that measure a particular EM emission pattern generated from said DUT, the EM signature data comprising a field emission map in a frequency or time domain;
   a fourth testing modality comprising a plurality of infrared (IR) imagers that captures a plurality of thermal signature data of said DUT surface;
   a fifth testing modality comprising a plurality of voltmeters providing a plurality of current versus voltage curve data by injecting voltage into one or more sections of said DUT and measuring a resulting current;
   a sixth testing modality comprising a plurality of electrostatic discharge (ESD) test equipment which can apply a pulse for measurement by one or more said EM sensors coupled with said DUT or with said oscilloscope providing one or more per pin pulse responses; and
   an seventh testing modality comprising a plurality of JTAG controllers used to set or read levels on said I/O pins via boundary scan, initiate logic built-in self-test (LBIST) or program internal memory.

2. The test system apparatus as in claim 1, wherein said test system generates an evaluation database based on outputs of said first through eight testing modality, said evaluation database is adapted for later data analysis of another DUT.

3. The test system apparatus as in claim 2, where said evaluation database further comprises a rule set for an expert system comprising IF, THEN statements where said IF statements are based on said test system evaluation database.

4. The test system apparatus as in claim 3, wherein said expert system includes an artificial intelligence processing and user interface engine applying general terms across families of microelectronic devices to replace human subject matter experts (SME) necessary to define a plurality of output modality data from said DUT by discriminating probabilities via fuzzy logic, pattern matching, reorganization, and rule sets.

5. The test system apparatus as in claim 2, wherein said evaluation database comprises a plurality of boxplots, principal component analysis (PCA), discriminate analysis (DA), neural network analysis, traditional statistical analysis, pattern reorganization, frequency analysis and histograms.

6. The test system apparatus as in claim 1, wherein said sensor array further comprises a plurality of sensors formed into a plurality of array configurations to detect particular EM emission patterns from a particular set of components on said DUT, wherein the said EM sensor array comprises a plurality of EM sensor types to include a combination of said E-field and H-field sensors of various bandwidths.

7. A testing process comprising:
   positioning a test assembly comprising a plurality of multiple characteristics modality sensors comprising electrical and optical sensors;
   positioning a known-good device under test (DUT) relative to the test assembly;
   positioning a plurality of said multiple characteristic modality in proximity with plurality of locations in relation to said DUT in a first sensor configuration;

selectively energizing and operating the known-good DUT based on a one or a plurality of first multiple test modality stimulus pattern inputs comprising an automated test equipment (ATE) or Joint Test Action group (JTAG) electrical test for providing IV curves, power signature, thermal signature, EM signature, inductance, capacitance, impedance, pin pulse response, time and frequency domain acquisition, into a plurality of sections on the known-good DUT, wherein the selective energization can comprise inputs associated with the first multiple test modality stimulus patterns input that is adapted to enhance or create a detectable unique multiple test modality device signature;

acquiring a plurality of first multiple test modality stimulus test result data from the one or a plurality of first multiple test modality stimulus patterns by using said plurality of multiple characteristics modality sensors;

storing the plurality of first multiple test modality stimulus data;

removing the known-good DUT;

positioning the second DUT relative to the test assembly;

position the plurality of multiple characteristics modality sensors at the plurality of locations in relation to the second DUT as was done with respect to the first sensor configuration;

selectively energizing and operating the second DUT to produce a second one or a plurality of first multiple test modality stimulus pattern inputs into a plurality of sections on the second DUT;

acquiring a one or more second plurality of multiple test modality stimulus test result data from one or a plurality of the first multiple test modality stimulus pattern previously used by using said plurality of multiple characteristics modality sensors in said first sensor configuration;

storing the plurality of second multiple test modality pattern data;

comparing the first and second multiple test modality pattern data;

determining if the first and second multiple test modality patterns are substantially identical or different based on matching, fuzzy logic, ranges associated with categories of modalities;

determining the second DUT as acceptable if the first and second multiple test modality pattern data match or determining the second DUT as unacceptable if the first and second multiple test modality patterns do not match or are outside of said predetermined ranges or specified correlation patterns/conditions.

8. A testing process comprising:

positioning a test assembly comprising a plurality of multiple characteristics modality sensors comprising electrical and optical sensors;

positioning a known-good device under test (DUT) relative to the test assembly;

positioning a plurality of said multiple characteristic modality in proximity with plurality of locations in relation to said DUT in a first sensor configuration;

selectively energizing and operating the known-good DUT based on a one or a plurality of first multiple test modality stimulus pattern inputs comprising an automated test equipment (ATE) or Joint Test Action group (JTAG) electrical test for providing IV curves, power signature, thermal signature, EM signature, inductance, capacitance, impedance, pin pulse response, time and frequency domain acquisition, into a plurality of sections on the known-good DUT, wherein the selective energization can comprise inputs associated with the first multiple test modality stimulus patterns input that is adapted to enhance or create a detectable unique multiple test modality device signature;

acquiring a plurality of first multiple test modality stimulus test result data from the one or a plurality of first multiple test modality stimulus patterns by using said plurality of multiple characteristics modality sensors;

storing the plurality of first multiple test modality stimulus data; and removing the known-good DUT.

9. A testing process as in claim 8, further comprising:

positioning the second DUT relative to the test assembly;

positioning the plurality of multiple characteristics modality sensors at the plurality of locations in relation to the second DUT as was done with respect to the first sensor configuration;

selectively energizing and operating the second DUT to produce a second one or a plurality of first multiple test modality stimulus pattern inputs into a plurality of sections on the second DUT;

acquiring a one or more second plurality of multiple test modality stimulus test result data from one or a plurality of the first multiple test modality stimulus pattern previously used by using said plurality of multiple characteristics modality sensors in said first sensor configuration;

storing the plurality of second multiple test modality pattern data;

comparing the first and second multiple test modality pattern data;

determining if the first and second multiple test modality patterns are substantially identical or different based on matching, fuzzy logic, ranges associated with categories of modalities; and determining the second DUT as acceptable if the first and second multiple test modality pattern data match or determining the second DUT as unacceptable if the first and second multiple test modality patterns do not match or are outside of said predetermined ranges or specified correlation patterns/conditions.

* * * * *